United States Patent [19]

Glaze

[11] 4,402,375

[45] Sep. 6, 1983

[54] CONTROL SYSTEM FOR A VEHICLE HYDRAULIC SUSPENSION ARRANGEMENT

[75] Inventor: Stanley G. Glaze, Brierley Hill, England

[73] Assignee: Lucas Industries Limited, Birmingham, England

[21] Appl. No.: 222,169

[22] Filed: Jan. 2, 1981

[30] Foreign Application Priority Data

Jan. 12, 1980 [GB] United Kingdom ............... 8001063

[51] Int. Cl.³ ............................................ B62D 55/14
[52] U.S. Cl. ............................... 180/169; 180/9.2 R; 280/707
[58] Field of Search ...................... 180/6.7, 169, 9.2 R, 180/169; 280/707, 703, 6 H, 6 R

[56] References Cited

U.S. PATENT DOCUMENTS

| 3,183,016 | 5/1965 | Gustafsson | 180/9.1 |
| 3,625,303 | 12/1971 | Cameron | 180/9.1 |
| 3,815,697 | 6/1974 | Bridwell et al. | 180/6.7 |
| 3,921,743 | 11/1975 | Parrish | 180/6.7 |
| 3,995,883 | 12/1976 | Glaze | 280/707 |

FOREIGN PATENT DOCUMENTS

| 1210712 | 10/1970 | United Kingdom | 280/707 |
| 1485003 | 9/1977 | United Kingdom | 280/707 |

*Primary Examiner*—Richard A. Bertsch
*Attorney, Agent, or Firm*—Andrus, Sceales, Starke & Sawall

[57] ABSTRACT

A control system for a vehicle hydraulic suspension arrangement which has damping control valves for regulating fluid flow between parts of the suspension, comprises means for generating an electrical signal corresponding to the range of an obstacle in the vehicle path, and means responsive to that signal for shutting a selected damping control valve so as to resist upward movement, relative to the vehicle body, of wheels carried by a part of the suspension which includes the selected valve, whereby the ground clearance of at least the part of the body carried by those wheels is increased.

7 Claims, 5 Drawing Figures

CONTROL SYSTEM FOR A VEHICLE HYDRAULIC SUSPENSION ARRANGEMENT

This invention relates to a suspension control system for a land vehicle.

It is known to provide a land vehicle having a hydraulic suspension system to which hydraulic fluid may be supplied under pressure, or released therefrom, to maintain a substantially constant distance between a body of the vehicle and the axes of its wheels.

This invention has as an object to provide a suspension system which is responsive to approach of the vehicle to an abruptly rising ground surface, or other obstacle, to prevent the distance between the vehicle body and at least the front wheels being reduced.

According to the invention there is provided a control system for a vehicle hydraulic suspension arrangement which has damping control valves for regulating fluid flow between parts of said suspension arrangement, said control system comprising means for generating an electrical signal in response to the presence of an obstacle in the vehicle path, and means responsive to said signal for operating a selected damping control valve so as to resist reduction in the distance between the axes of wheels supported by the suspension arrangement which includes said selected valve, and a location on the vehicle body adjacent said wheels.

An embodiment of the invention will now be described by way of example only and with reference to the accompanying drawings in which.

Figure 1:
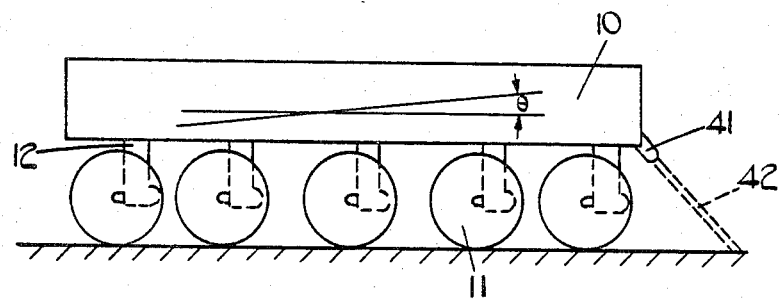
FIG. 1 shows, diagrammatically, a side elevation of the vehicle.
Figure 2:
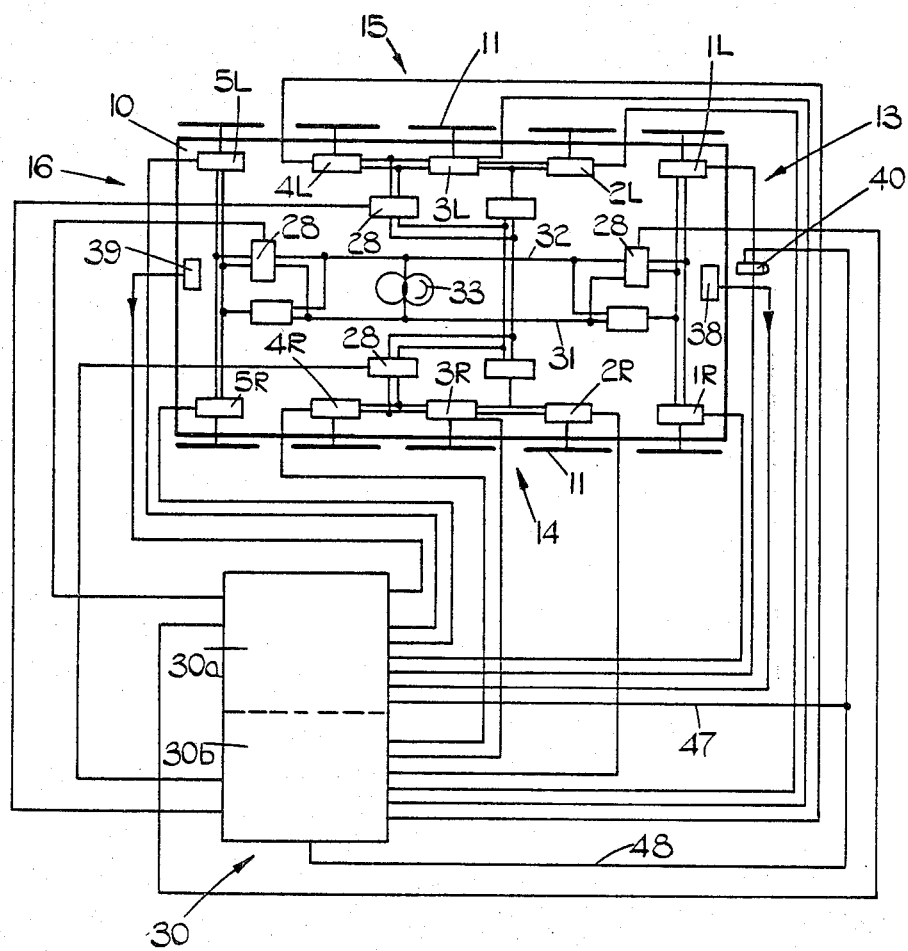
FIG. 2 is a diagrammatic plan view of the vehicle of FIG. 1, indicating the hydraulic suspension arrangement and control circuits therefor.
Figure 3:
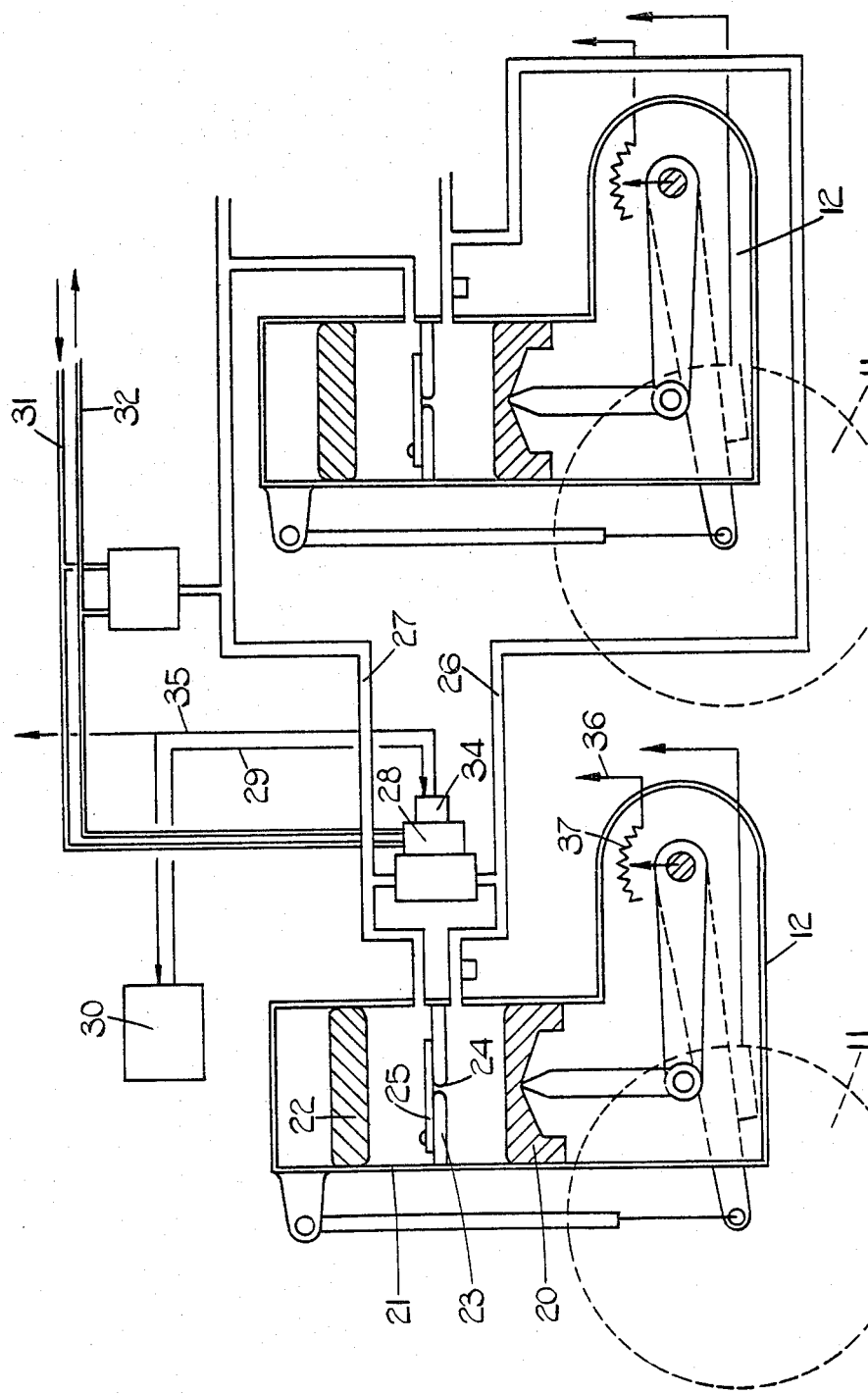
FIG. 3 shows, in more detail, part of the vehicle suspension arrangement.

As shown in FIGS. 1, 2 and 3 a vehicle has a body 10 and ten wheels 11, each of the wheels 11 having a hydraulic suspension device 12 secured to the body 10. The wheels 11 and suspension devices 12 are arranged in four groups, the suspension devices 12 in each group being hydraulically interconnected.

The first such group 13 comprises suspension devices 1R, 1L, the second group 14 comprises devices 2R, 3R, 4R, the third group 15 comprises devices 2L, 3L, 4L, and the fourth group 16 comprises devices 5R, 5L.

Figure 4:
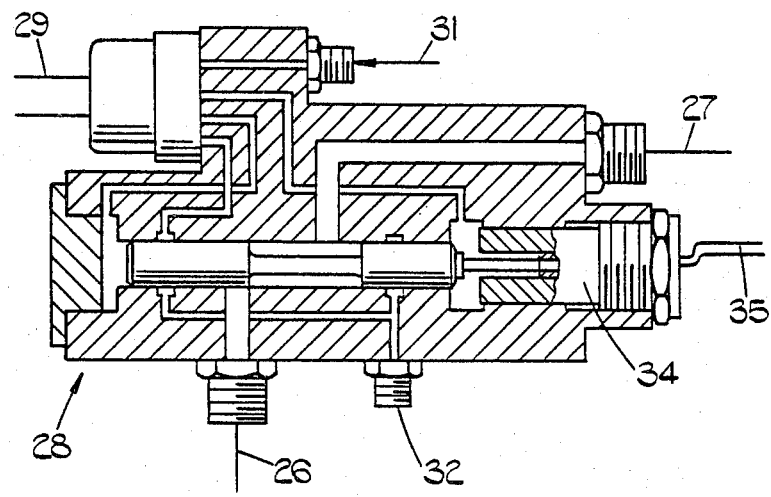
FIG. 4 shows details of a valve forming part of the suspension arrangement.
Figure 5:
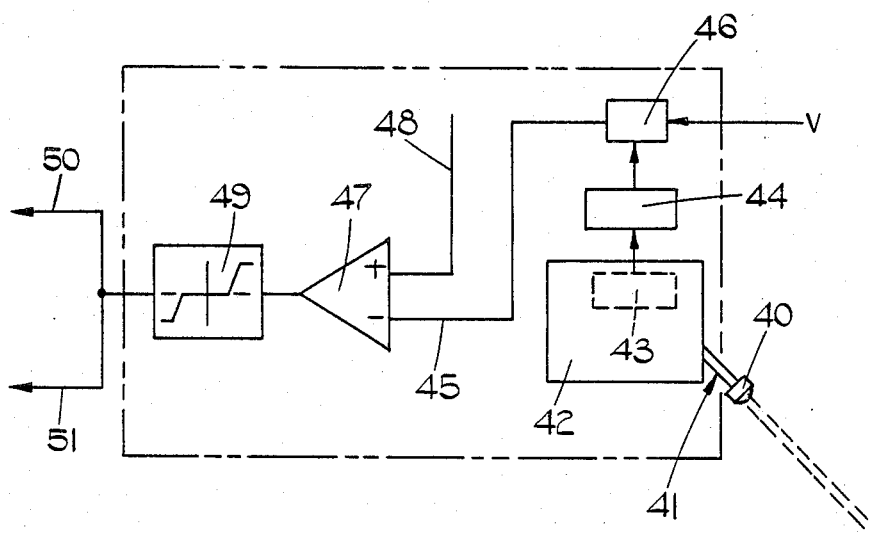
FIG. 5 shows, diagrammatically the control circuit of FIG. 2.

FIG. 3 shows the manner in which the suspension devices 12 of the groups are hydraulically interconnected. Each of the devices 12 has a piston 20 slidable in a cylinder 21 and responsive to vertical movements of the wheel 11. Also slidable in the cylinder 21 is a free piston 22, and the pistons 20, 22 are separated by a wall 23 through which there is a restricted orifice 24. The orifice 24 is closable by a flap valve 25 which is operable to shut the orifice 24 in response to downward movement of the piston 20, 22. A line 26 communicates with the space between piston 20 and wall 23 and a line 27 communicates with the space between wall 23 and piston 22. The lines 26, 27 communicate with corresponding spaces in the suspension devices 12 forming part of the same group. Between the lines 26, 27 is an electrohydraulic servo valve 28 which is shown in more detail in FIG. 4 and which is responsive to electrical control signals on a line 29 from a control circuit 30. Hydraulic operating power for the valve 28 is derived from hydraulic pressure and return lines 31, 32 connected to a pump 33 (FIG. 2). The valve 28 includes a transducer 34 for providing, on a line 35, a signal corresponding to the operating position of the valve 28.

The connections between the control circuit 30 and the suspension arrangement are shown in more detail in FIG. 2. The control circuit 30 is of the type described in British Pat. No. 1,485,003. The circuit 30 is responsive to signals on line 36 from displacement transducers 37 in the suspension devices 12, the signals on lines 36 corresponding to the positions of the wheels 11 relative to the vehicle body 10. The circuit 30 is, as already described, responsive to position feedback signals on the lines 29 from the valves 28.

As indicated in FIG. 2 the circuit 30 is in two portions, 30a and 30b. Portion 30a is responsive to signals from the transducers 34, 37 in the wheel groups 13 and 16, and also to signals from accelerometers 38, 39 at the front and rear respectively of the vehicle body 10. The circuit portion 30a provides output control signals for regulating the flow of damping hydraulic fluid through the valves 28 of the wheel groups 13, 16. The circuit portion 30a is thus operable to control pitching movement of the vehicle body 10.

The circuit portion 30b is responsive to signals from the transducers 34, 37 in the wheel groups 14, 15 and provides output signals to control the valves 28 in those groups. The circuit portion 30b is thus operable to control vertical movement of the body 10 as a whole, this movement being conveniently referred to as "heave".

A device 40 emits energy pulses 42 which are directed to strike the ground at approximately 1.5 m from the device 40. The device 40 is a transducer which forms part of an ultrasonic ranging unit of a type available from the Polaroid Corporation of Cambridge, Mass., U.S.A. and is connected by transmit and receive lines 41 to a ranging control circuit 42, also of a type available from the Polaroid Corporation. The circuits 42 includes a 3 digit binary counter 43 whose outputs are connected to a digital to analog converter 44, the voltage output of which is supplied to a line 45 through a circuit 46 which is additionally responsive to vehicle speed V, for modifying the signal on line 45 in accordance with this speed. The signal on line 45 is supplied to one input of an amplifier 47 whose other input is provided by a manual selection signal on a line 48. Output signals from the amplifier 47 are passed through a limiting circuit 49 having a central "dead zone" which prevents the system from being responsive to minor irregularities in the ground in front of the vehicle and the output signals from the circuit 49 are passed on lines 50, 51 to the respective portions 30a, 30b of the control circuit 30. It is arranged that the circuit 46 causes the magnitude of the signal on line 45 to increase with increasing vehicle speed, so that the output of the amplifier 47 exceeds the dead zone values of the circuit 49 at longer ranges when the vehicle speed is high. The manual selection signal on line 48 provides a reference against which the system as a whole responds, and varying the value of this selection signal can thus cause the output of the amplifier 47 to exceed the dead zone values of the circuit 49, and thus permit ground clearance to be increased in advance of detection of an obstacle by the device 40.

If the signals on the lines 50, 51 indicate the presence of an obstacle, and hence a requirement to resist any reduction in the ground clearance of the vehicle body 10, the valves 28 of the suspension groups 13, 14, and 15 are opened by the signals on lines 50, 51 during relative downward movement of the wheels 11 in these groups relative to the body 10, and shut during their upward relative movement. In this condition vertical movement of the wheels in these groups, due to ground roughness, causes the ground clearance of the front of the vehicle body 10 to be increased, minimising the chance of collision between an obstacle and unsprung parts of the vehicle until the wheels 11 encounter the obstacle and lift the vehicle over it. Moreover, any tendency for the distances between the axes of the wheels in these groups and adjacent parts of the vehicle body to be reduced is resisted, the resultant stiffening of the suspension of these wheels ensuring that the body is lifted by the wheels as the latter encounter the obstacle.

Removal of the output signals on the lines 50, 51 allows the suspension control circuit 30 to recommence normal operation and the wheels to move relative to the vehicle body on their suspension.

I claim:

1. A control system for a vehicle suspension arrangement which includes a suspension device, a wheel mounted on said device for upward and downward movement relative to a body of the vehicle, and a flow control valve through which fluid is displaced as a result of said relative movement, said control system comprising means for detecting the presence of an obstacle in the path of the vehicle, means for generating an electrical signal in response to said detection, and means responsive to said electrical signal for causing said valve to permit an increased fluid displacement during relative downward movement of the wheel and for causing said valve to reduce said fluid displacement during relative upward movement of the wheel, whereby the distance between the axis of said wheel and an adjacent location on the vehicle body tends to increase, and reduction in said distance is resisted.

2. A system as claimed in claim 1 in which said signal generating means includes means for generating a second signal which corresponds to the range of an obstacle from the vehicle, and means responsive to said second signal for generating the first-mentioned signal.

3. A system as claimed in claim 2 in which the means for generating said second signal comprises an ultrasonic device.

4. A system as claimed in claim 2 or claim 3 which includes means for inhibiting generation of said first-mentioned signal in response to values of said second signal below a predetermined level.

5. A system as claimed in claim 4 which includes means for increasing the magnitude of said second signal in response to an increase in the speed of the vehicle.

6. A system as claimed in claim 1 in which said control valve forms part of a suspension arrangement for wheels adjacent the front of the vehicle.

7. A control system for a vehicle suspension arrangement which includes a suspension device, a wheel mounted on said device for upward and downward movement relative to a body of the vehicle, and a flow control valve through which fluid is displaced as a result of said relative movement, said control system comprising means for detecting the presence of an obstacle in the path of the vehicle, means for generating an electrical signal in response to said detection, and means responsive to said electrical signal for operating said valve so as to resist reduction in the distance between the axis of said wheel and an adjacent location on the vehicle body, and so as to provide reduced resistance to an increase in said distance.

* * * * *